July 11, 1961 M. D. MacARTHUR 2,992,019
CASING JOINT HAVING METAL-TO-METAL SEALING MEANS RESPONSIVE TO FLUID PRESSURE
Filed July 7, 1958 4 Sheets-Sheet 1
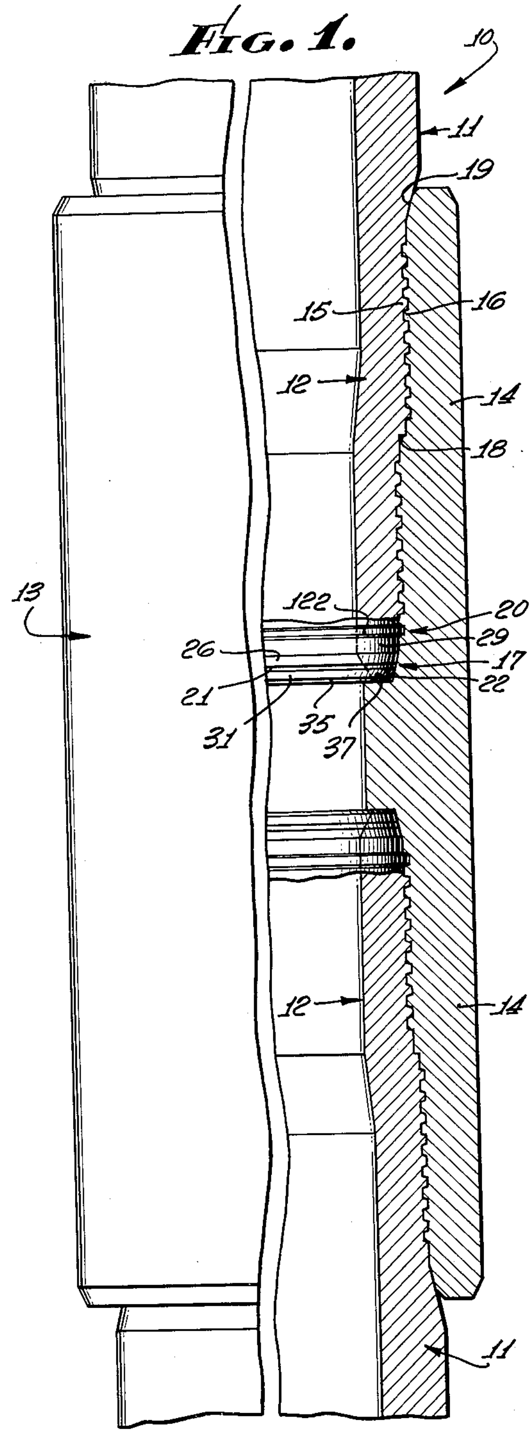
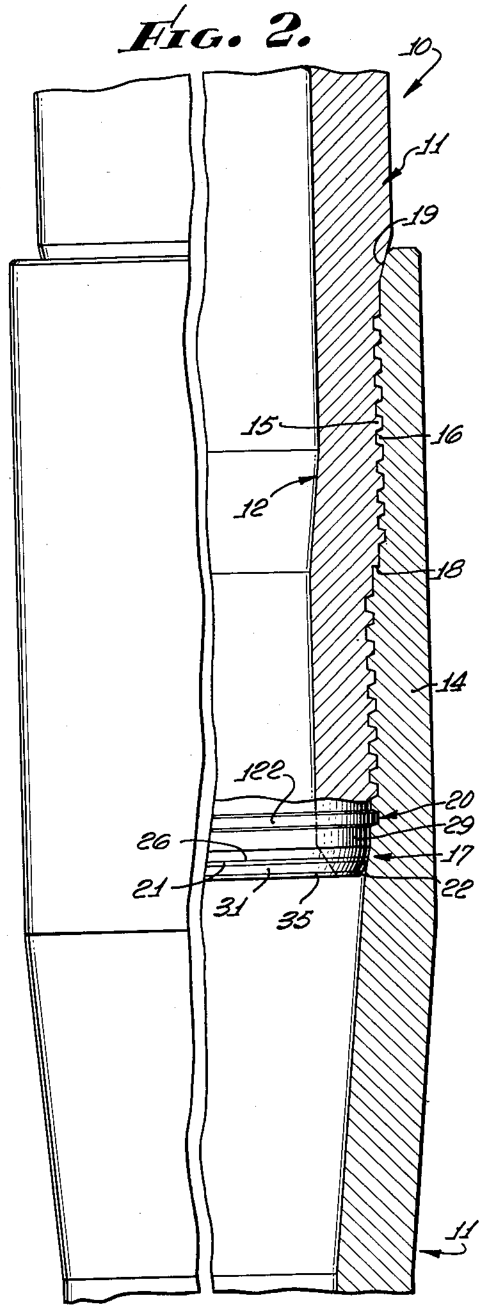
INVENTOR.
MELVIN D. MACARTHUR
BY White & Haefliger
ATTORNEYS.

INVENTOR.
MELVIN D. MACARTHUR
BY White & Haefliger
ATTORNEYS.

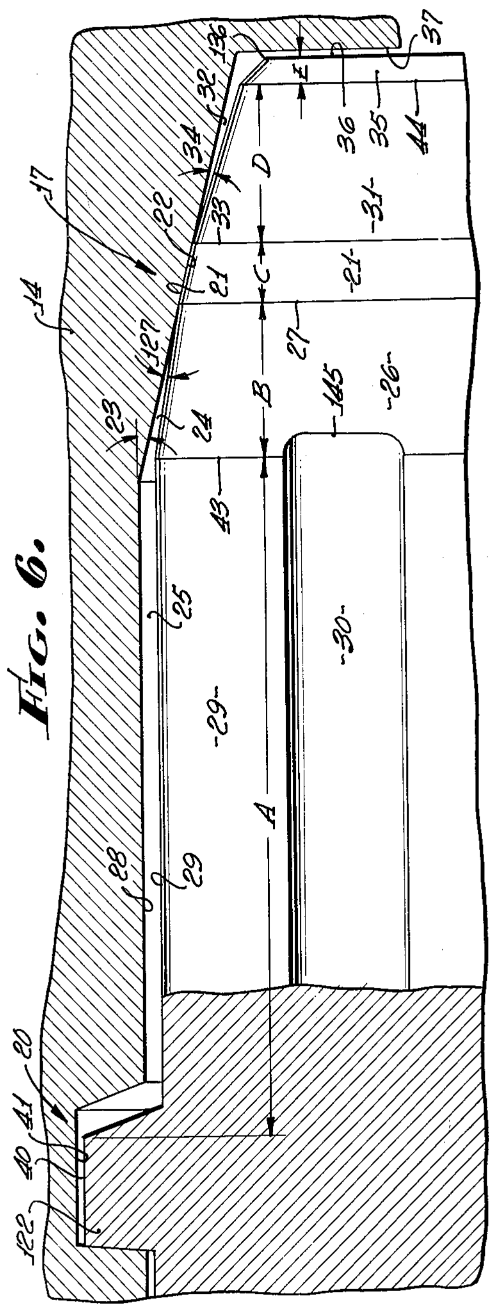
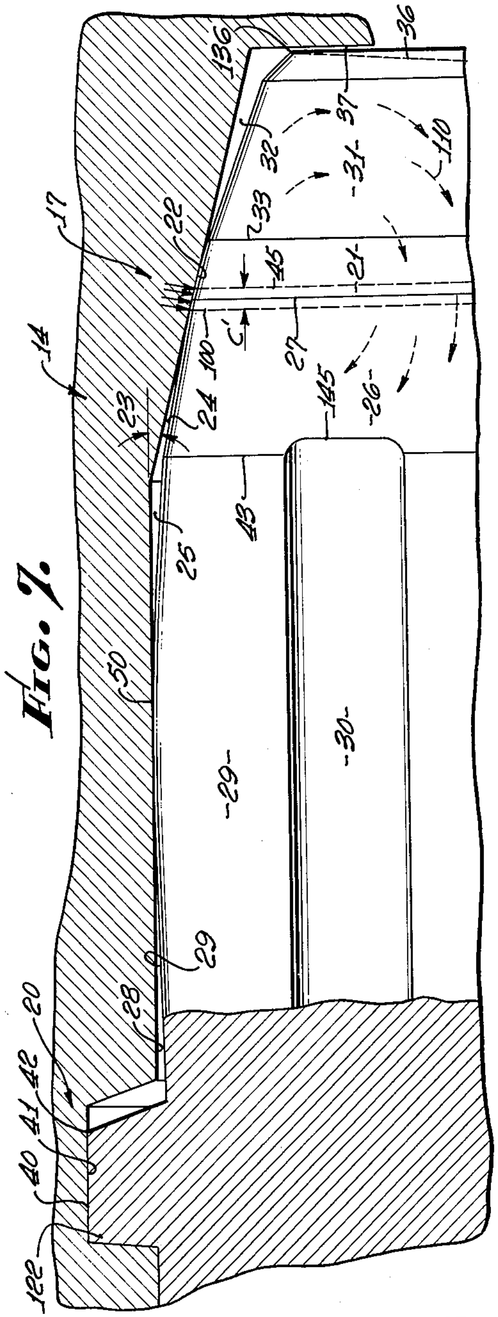
INVENTOR.
MELVIN D. MACARTHUR
BY White & Haefliger
ATTORNEYS.

July 11, 1961 M. D. MacARTHUR 2,992,019
CASING JOINT HAVING METAL-TO-METAL SEALING MEANS RESPONSIVE TO FLUID PRESSURE
Filed July 7, 1958 4 Sheets-Sheet 4
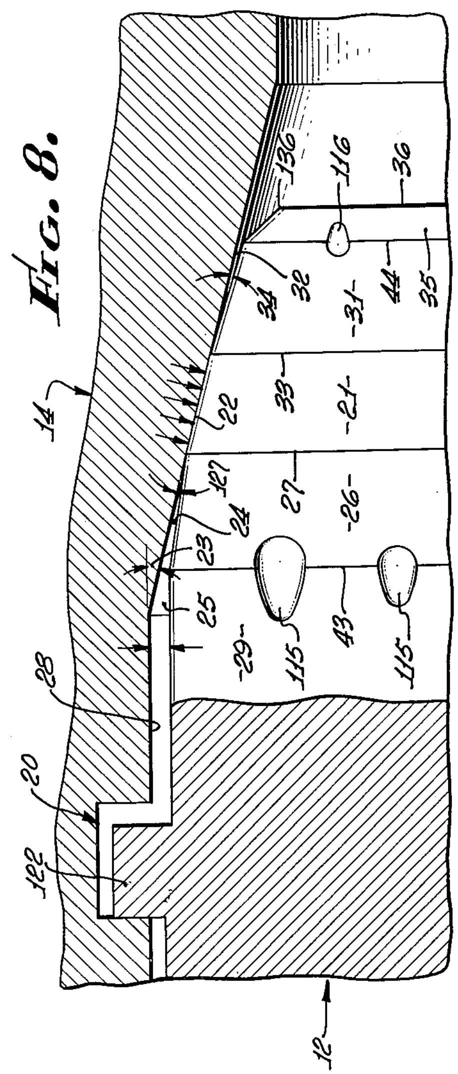
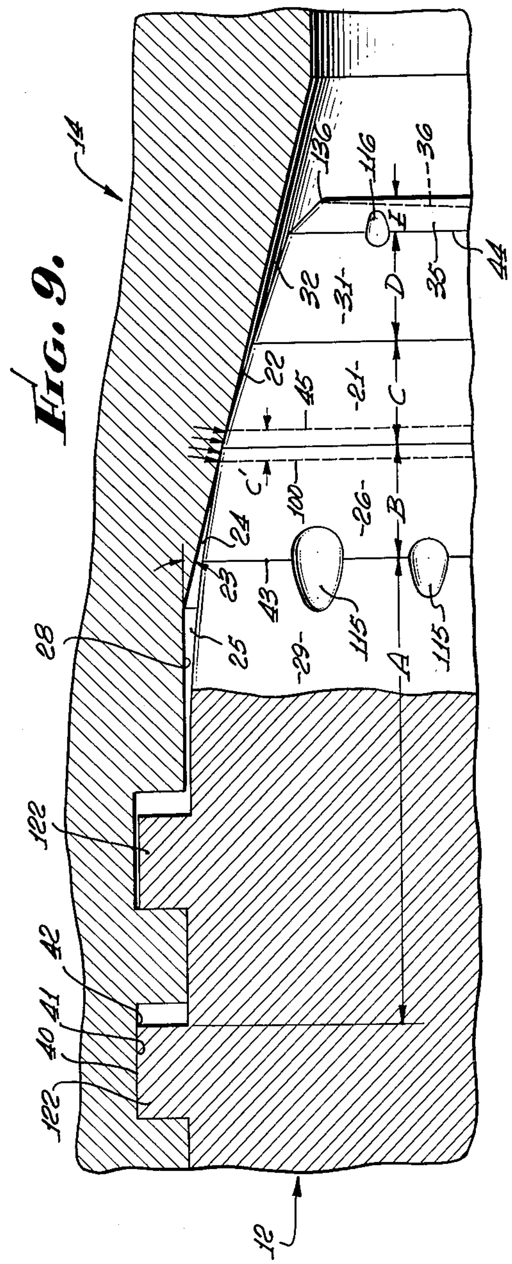
INVENTOR.
MELVIN D. MACARTHUR
BY White & Haefliger
ATTORNEYS.

2,992,019
Patented July 11, 1961

2,992,019

CASING JOINT HAVING METAL-TO-METAL SEALING MEANS RESPONSIVE TO FLUID PRESSURE

Melvin D. MacArthur, Los Angeles, Calif., assignor to Hydril Company, Los Angeles, Calif., a corporation of Ohio Filed July 7, 1958, Ser. No. 746,759
15 Claims. (Cl. 285—110)

This invention relates generally to oil well casing, and more particularly has to do with the construction of high pressure casing joints operable when made up and run into a well to withstand extreme fluid pressures, sealing off against escape thereof through the casing wall at the joints.

As presented, the problem solved by the present invention concerns the tendency of known types of casing joints to leak when subjected to high well fluid pressures. Thus, in the case of one common type joint having pin and box members made up to exert sealing pressure across interengaged metal shoulders of considerable annular tapered extent, the sealing pressure will vary around the annulus of interengagement due to unavoidable slight misalignment of the tapered shoulders produced upon joint make-up, and local reductions in such sealing pressure will at unpredictable times permit leakage of well fluid at pressures below that against which the joint was originally designed to effectively seal.

Efforts to alleviate this particular problem have resulted in the development by the oil well casing manufacturing industry of what is known as the "crowned" seal joint, that is, a pin and box joint in which the sealing face or surface of the pin periphery is "crowned" or rounded in a radial axial plane so that the pin "crown" will engage the box with uniform pressure, eliminating the misalignment difficulty producing local reduced sealing pressure, as mentioned above. However, experience has shown the industry that this type joint is relatively ineffective to prevent joint leakage where the well pressure is in excess of uniform sealing pressure developed at the pin and box engagement shoulders during joint make-up, representative excess well pressures being in the range 10,000 to 20,000 p.s.i.

High pressure casing normally is made of high strength steel, which is so elastic that the stretch in the steel under high pressure is considerable. Metal movement accompanying stretch should be directed so that during application of high pressure such movement tends to produce a more effective seal rather than a less effective seal, as has been the case heretofore.

It is well known that the contact pressure between the mating metal to metal sealing surfaces must at all times be greater than the fluid pressure that the seal is sealing against, for otherwise the fluid pressure will pry open the seal, with resultant leakage. To accomplish this end, several alternatives are possible, as enumerated below:

(1) Reduce the width of the metal to metal contact so as to correspondingly increase the unit contacting pressure when the joint is made up.

(2) Machine the parts with increased accuracy and uniformity so as to reduce the variations in contacting pressure around and over the contacting sealing surfaces in an effort to establish fairly uniform contacting pressure.

(3) Construct the seal so that it is "self energizing," that is so that fluid pressure increases the contacting pressure over what it was originally, i.e. when the joint was first made up.

These alternatives as to casing joint construction are frustrated in their purpose for sealing against extremely high pressures partly because the initial contacting pressure cannot in practice be increased the required amount.

If the seal is made too narrow, that is for high contact pressure, the metal surfaces will gall during make up of the joint and the seal is thereby lost. Thus, a seeming dilemma is presented: low contact pressure is required to resist galling, yet high contact pressure is required for a high pressure seal. The present invention proposes to solve this dilemma by taking advantage of the considerable elastic movement of high strength steel so that the seal is made up at moderate contacting pressure, and then the power of the fluid pressure elastically rocks the seal into a position of high contacting pressure as needed for sealing high fluid pressure. Subsequently fluid pressure may be released and then the seal elastically rocks back into position of low contacting pressure, and the joint may then safely be unscrewed.

To the best of my knowledge, the prior art is barren of any teaching as to joint rocking flexibility as an intended mechanical movement to improve the sealing function under high pressure. In this respect, past art seems to envision seal stability under pressure so that the concept of improving the casing joint seal during application of high pressure is new. In fact, older type lower strength steels for lower pressure pipes tended to be virtually stable, and elastic movement of the contemplated sort would not occur to any appreciable extent.

The present invention is predicated on the concept that properly constructed pin and box members, when made-up into a joint, can withstand and effectively seal against fluid pressures greatly in excess of the maximum metal-to-metal sealing pressure developed at the interengaged pin and box sealing shoulders upon joint make-up, and that at the same time the sealing pressure developed at those shoulders can be made substantially uniform around the annular locus of the metal-to-metal seal.

In accordance with the invention, the present oil well casing joint comprises tubular pin and box members, the pin member being received axially forwardly into the box member, the members having interfitting threads and interengaged annular shoulders spaced forwardly of the threads and through which sealing pressure is exerted. There is critically angled annular clearance between the members extending rearwardly from the interengaged annular shoulders, at least one of the members being provided with a forwardly tapering annular surface extending adjacent the clearance and intersecting the shoulder on said one member along a sharply defined circular locus extending about the joint axis and at which locus tangents to the surface and shoulder in the same axial radial plane are angled with respect to one another. As a result of this joint construction, increased fluid pressure within the pin bore will deflect the pin radially outwardly at said clearance thereby decreasing the forward extent of the shoulder interengagement area and increasing the sealing pressure keeping it greater than the increased fluid pressure. Therefore, the joint can withstand and effectively seal against fluid pressure greatly in excess of the maximum metal-to-metal sealing pressure developed at the interengaged pin and box sealing shoulders upon joint make-up, since advantage is taken of the increased fluid pressure to "rock" the pin in such a way that the sealing pressure at the interengaged pin and box shoulders increases and remains greater than the increased fluid pressure.

As will be brought out, the interengaged, annular, forwardly tapering sealing shoulders on the pin and box between which sealing pressure is transmitted are preferably frusto-conical, and have forward extent which is substantially less than that of the complete tapering of the pin periphery at its forward end, and then the overall tapering of the box bore opposite the pin tapered periphery. Therefore, when the joint is made-up there is almost no chance for the pin and box interengaging shoulders to misalign and develop localized areas of reduced sealing pressure transmission.

A special problem requiring attention in high pressure casing joints is brought about by accidental joint damage which tends to destroy the seal. In ordinary seals of simple cone frustum construction the cones do not match perfectly due to manufacturing variations, so that they tend to seal at one end or the other of the frustums. These critical sealing ends of the cone frustums present protuberances which receive the brunt of handling damage, and in fact almost all handling damage occurring at the seals falls at these protuberances and it is fairly expected in the trade that a few joints are so damaged, with loss of seal, in any shipment. The present invention incidentally "relieves" the seal by placing the damage vulnerable protuberance where it does not participate as a seal even when the members rock into new position under high internal pressure. This point needs to be emphasized further: In all commercial production casing joints the threads and the seals are produced in separate machining operations so that some eccentricity between these surfaces is inevitable. The intersection of these surfaces, as a locus, then must necessarily be a wavy line (rather than a true circle) so that as a sealing line it will always be expected to behave somewhat as though it were damaged—especially when high pressures are applied. In hobbed threads, the "wave" line is readily visible to the eye in the area where the hob overlaps itself in producing the thread. In tapped threads, the eccentric run-out wave is less conspicuous but still considerable because it is customary in the trade to permit the taps and dies to "float," whereas the seal finishing tools are not permitted to float. In this invention the seal and the "relief" may readily be produced in the same machining operation so that all the participating portions of the seal have maximum opportunity for engagement along truly circular surfaces and edges, both as made up and as rocked into high pressure sealing position. In accordance with the invention, the "relief" divergence angle is made greater than the anticipated angular "rock" under high pressure, and at the same time the divergence angle is kept moderate, for otherwise a new "protuberance" is presented defeating the damage resistant characteristics of the novel joint construction. Thus, effective sizing of the divergence angle is necessarily critically restricted in order that the relief angularity may accomplish its double purpose.

These and other objects of the invention, as well as the details of an illustrative embodiment, will be more fully understood from the following detailed description of the drawings, in which:

FIG. 1 is a vertical elevation of the exteriors of two casing sections interconnected by a coupler, with the view being partly broken away to show the interior of the joint embodying the present invention;

FIG. 2 is a vertical section, partly broken away, showing a casing joint of modified construction and embodying the present invention;

FIG. 6 is a view similar to FIG. 3 showing the same joint elements with much greater axial spacing between the joint threads and the joint pressure sealing shoulders;

FIG. 7 shows the FIG. 6 joint elements as they appear during the application of high well fluid pressure to the bore of the pin member;

FIG. 8 is an enlarged vertical section illustrating a slightly modified joint, as initially made up; and FIG. 9 is a view similar to FIG. 8 showing the pin in rocked condition during application of high well fluid pressure to the pin bore.

Figure 3:
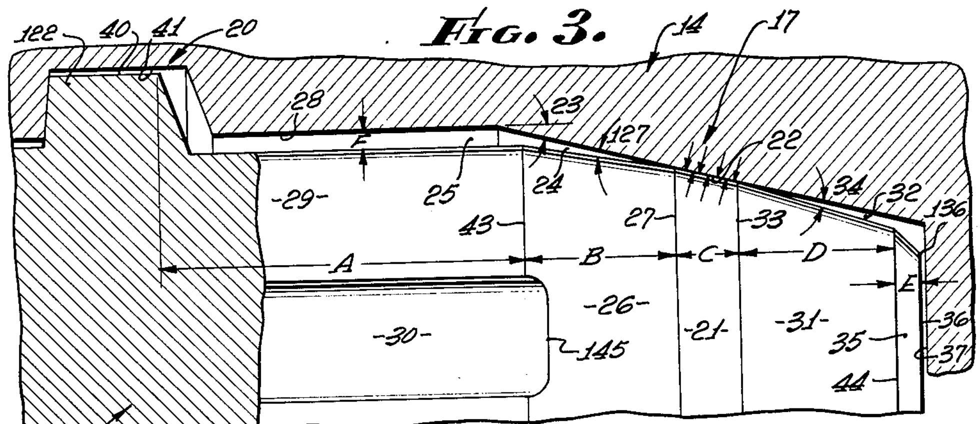
FIG. 3 is an enlarged vertical section illustrating the particular portions of the joints of FIGS. 1 and 2, with which the invention is concerned.

In FIG. 1 a tubing string 10 is made-up of casing sections 11 including pin members 12 interconnected by a coupler 13, the latter including integral box members 14. The construction of the FIG. 2 joint differs from that of FIG. 1 in that the casing or pipe sections 11 respectively include pin members 12 and box member 14, no coupler being necessary.

Each of the interconnected box members in FIGS. 1 and 2 include interfitting pin and box square cut threads 15 and 16 respectively, formed in two relatively stepped sections, as illustrated, so as to provide these high pressure seals at locations 17, 18 and 19. The inside and outside seals 17 and 19 respectively, are established substantially simultaneously when the joint is spun up, and the center seal 18 between the thread steps is established when the joint is tonged to final make-up. The invention is particularly concerned with the construction of the so-called inner, high pressure, metal-to-metal seal at 17 in relation to the forward end of the pin and box thread at 20 and the clearances between the pin and box members at and between these seal and thread locations, as will be described.

Referring now to FIG. 3, wherein the joint elements with which the invention is primarily concerned are shown in greatly enlarged form, the forward end portion of the pin member 12 includes a frustro-conical sealing shoulder 21 spaced forwardly of the forward terminus of the pin thread 122. Shoulder 21 pressurally engages the frustro-conical, forwardly tapering, internal shoulder 22 on the box member, the tapering of both shoulders 21 and 22 being the same and the angularity thereof with respect to the axis of the joint being designated at 23, typical angularity being around 14°.

The pin and box members 12 and 14 have annular clearances 24 and 25 therebetween rearwardly of the interengaged shoulders 21 and 22 and forwardly of the terminus of the pin thread 122. Clearance 24 is formed between the rearward extension of box shoulder 22 and the forwardly tapering, annular pin surface 26 extending adjacent clearance 24 and intersecting the pin shoulder 21 along a circular line or locus 27 at which tangents to the surface 26 and the shoulder 21 in the same axial radial plane, for example the plane of FIG. 3, are angled with respect to one another, as designated at 127. Clearance 25 is formed between the cylindrical bore 28 of the box member and the cylindrical periphery 29 turned on the pin member, and typically that clearance 24 will be between .008 and .018 inch. The indentation designated at 30 in the turned surface 29 of the pin and intersecting the forwardly tapered surface 26 of the pin is unavoidably cut or gouged into the pin when the rotary hob has finished cutting the thread 122 and the side loading exerted thereon by the hob is relieved causing the pin surface 29 to spring back against the hob teeth. Thus, the indentation 30 represents a potential path or avenue of fluid pressure escape through the joint if provision is not made for restricting rearward travel toward the indentation 30 of the rearward limit of the metal-to-metal seal between the pin and box members forwardly of the indentation, during pressure rocking of the pin as will be described. As will be explained, this is taken care of by locating the line or locus 27 forwardly of the hob indentation 30 and by causing the locus 27 to be sufficiently sharply defined.

Additional clearance 32 is formed between the forwardly tapering annular surface 31 of the pin and the forward extension of the box frustro-conical shoulder 22. Pin surface 31 intersects pin shoulder 21 along a circular line or locus 33 parallel to line 27, and tangents to surface 21 in the same axial radial plane are angled with respect to one another as indicated at 34. Finally, the extreme forward end portion of the pin has a sharply increased annular peripheral taper at 35 continuing forwardly to the forward end 36 of the pin, which is spaced from the box shoulder 36.

Figure 5:
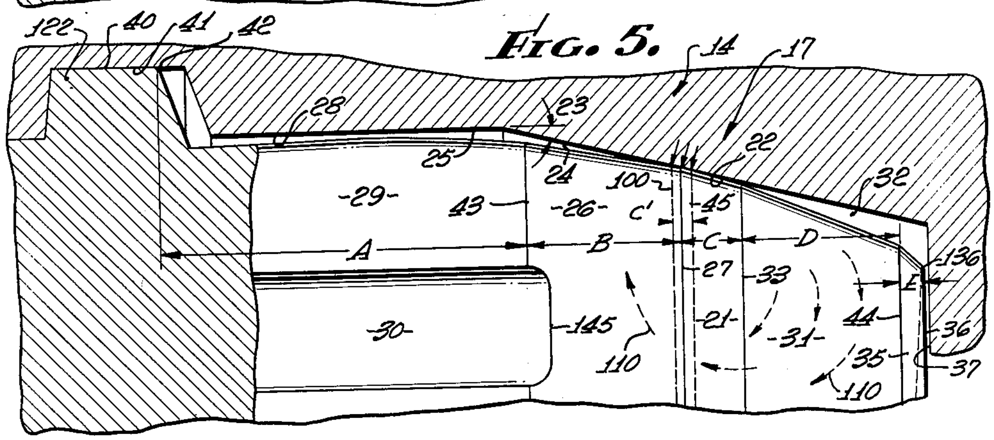
FIG. 5 is a view showing the FIG. 3 joint elements as they appear during the application of high well fluid pressure to the bore of the pin member.

Referring now to FIG. 5, it will be seen that extreme pressure of fluid within the pin bore outwardly deflects the pin metal so as to displace the pin surfaces 26 and 29 radially outwardly into the clearances 24 and 25. At the same time, the crest 40 of the pin thread 122 is expanded outwardly by such pressure exertion into engagement with the box thread root 41. Thus, the initially unsupported portion of the pin including surfaces 26 and 29 between the locus or line 27 and the forward terminus 42 of the pin thread crest 40 in engagement with the box thread deflects outwardly in the manner illustrated, which is exaggerated for purposes of showing the effects of pressure application. This initially unsupported length of the pin is designated by the sum of the dimensions "A" and "B," the former dimension being taken between the most forward point of support 42 of the pin thread crest and the circular locus 43 representing the intersection between the cylindrical surface 29 and the tapered surface 26. The latter dimension "B" is taken between loci 43 and 27 and is a measure of the forward extent of the tapered surface 26. In like manner, dimension "C" designates the forward extent of pin shoulder 21 between loci 27 and 33 and "D" indicates the forward extent of tapered surface 31 between loci 33 and 44. Dimension "E" indicates the forward extent of the extreme tapered forward end surface portion 35 of the pin, and is taken between locus 44 and the end surface 36 of the pin.

Since the initialy unsupported extent of the pin between support locations 42 and 27, as designated by the sum of the dimensions "A" and "B," is much greater than the extent of the pin between support location 27 and the forward end 36 of the pin, as designated by the sum of the dimensions "C," "D" and "E," the pin deflects as shown in FIG. 5, in effect "rocaking" about the locus 27 when subjected to extreme fluid pressure within the pin bore. As a result, the total area of interengagement between pin and box shoulders 21 and 22, which originally was extended forwardly throughout the dimension "C," is reduced in proportion to the amount of pin deflection or rocking about the locus 27 so that as viewed in FIG. 5 only that portion of the pin between movable broken line loci 100 and 45, having a forward dimension C′ remains in pressural engagement with the box shoulder 22, as indicated by the arrows normal to the interengaged shoulders. Therefore, since the force transmitted from the pin to the box has not diminished, and since the area through which all of this force is transmitted has been reduced, the sealing pressure transmitted at the interengaged shoulders is substantially increased, and with proper proportioning of the pin in relation with the box the sealing pressure can be made to increase in response to increased fluid pressure exertion upon the pin bore so as to keep the sealing pressure greater than the increased fluid pressure. Therefore, the joint will not leak no matter by how great an amount the fluid pressure increases, within the limits of the strongest pipes commercially obtainable. That is, the joint will not leak up to pipe bursting pressures.

As regards the dimensions previously spoken of, it is first of all necessary that the dimension B be greater than the forward extent of the hob-cut indentation 30 beyond the locus 43, the extreme forward end of the hob indentation being designated at 145, and by an amount in excess of the expectable travel of locus 100 rearwardly of locus 27 during pressurization of the joint. If the hob indentation were to extend forwardly to locus 27, the joint would leak during the application of extreme fluid pressure to the joint, since the fluid would have access from the clearance 32 to the indentation 30 when the pin had rocked about locus 27 to an extreme degree.

Next, in regard to proportioning the pin and box members, the sum of the dimensions A and B should be substantially and sufficiently greater than the sum of the dimensions C, D and E, so that the pin will rock sufficiently about locus 27 to keep the sealing pressure transmitted between interengaged shoulders 21 and 22 greater than the fluid pressure contained within the pin bore. Dimension C should not be so great that shoulders 21 and 22 will become axially misaligned during make-up of the joint, for otherwise the sealing pressures developed at interengaged shoulders 21 and 22 will be non-uniform around the seal. At the same time, dimension C should not be so small that increased sealing pressure will produce galling between the sealing surfaces. Experience shows that dimension C must be between 5/64 and 7/64 inch for all normal oil well pipe casing, which will vary between 4½ and 9⅝ inches in diameter and between 5/16 and 9/16 inch pipe wall thickness for high pressure casing.

My effort in this new seal construction is to produce more sealing performance uniformity, and this effort has revealed that a short cone frustum, 5/64 to 7/64 inch long produces a uniform width seal around the whole sealing periphery without material variation. In other words, the effect of angle manufacturing error vanishes when the cone frustum length is between these limits. This cone frustum length is critically important in a casing joint for achieving both a low pressure seal and a high pressure seal while at the same time achieving ease of screwing the seal home without surface gall.

The relief or clearance angle designated at 127 must lie within the range 3 to 4½ degrees, for if the angle is less than 3 degrees, the locus 27 will not be well defined and the rearward limit of pin interengagement with the box as designated by locus 100 will tend to travel excessively rearwardly toward the hob indentation 30 during pressure rocking of the pin as described, with the danger of joint leakage at the hob indentation. If the clearance angle at 127 is more than 4½ degrees, the locus 27 is so sharply defined that upon pressure rocking of the pin the shoulders 21 and 22 will permanently indent and permanently deform the box shoulder 22 at the reduced interengagement area and especially at the location of the locus 27. Referring to the clearance angle 34, it must be kept within the range 1 to 2 degrees, for if this angle is greater than 2 degrees, the locus or line 33 will be so sharply defined as to gouge into the box shoulder 22 during make-up of the joint. If less than 1 degree, the normal manufacturing error in turning the pin surface 31 will frequently eliminate the desired angularity 34 and the well defined line 44 will then plow into the box shoulder 22 during make-up of the joint. Observing these upper and lower limits for the angles 127 and 34, the dimensions B, C, D and E will be in the approximate ratio, 8, 5, 8 and 2. Thus, taking dimension C to be 5/64 inch, dimensions B and D will both be about ⅛ inch, whereas dimension E will be approximately 1/32 inch, for normal oil well casing.

FIGS. 6 and 7 are similar to FIGS. 3 and 5, respectively, in that they show similar pin and box members constructed in accordance with the teachings of the present invention, the principal difference being that the dimension A in FIGS. 6 and 7 is much greater than the corresponding dimension in FIGS. 3 and 5. Therefore, the sum of the dimensions A and B in FIGS. 6 and 7 is much greater than the sum of the dimensions C, D and E, and as a result the pin tends to rock to a greater extent about the locus 27 as shown in FIG. 7 for the same pressure application, with correspondingly reduced clearance 25. In FIG. 7 the pin has rocked so that the pin surface 29 engages the box surface 28 at 50, preventing further rocking of the pin about locus 27. This limits the sealing pressure build-up at the zone of width C′ between loci 100 and 45, and the design of the pin and box members may be such that when this upper limit of sealing pressure build-up is reached, it will be greater than any contemplated fluid pressure increase within the bore. In all cases, dimensions A plus B should be sufficient in relation to clearances 24 and 25 that the pin surface 29 will deflect or expand outwardly into engagement with the box surface 28 as at 50, preventing further rocking about locus 27, before the clearance 24 becomes closed, i.e. when locus 100 is well forward of line 43 and hob cut indentation 30.

As respects the manner in which the pin section moves during pressure rocking, a comparison of FIGS. 3 and 5, and of FIGS. 6 and 7 will show that the forward outer edge 136 of the pin moves closer to the box shoulder 37 during pin rocking movement, while the plane of the forward end 36 of the pin as shown in broken lines in FIGS. 5 and 7 is angularly displaced from its initial perpendicularity with respect to the pin axis. This indicates that metal in the forward end of the pin gyrates toroidally as indicated by the arrows 110, and the actual moving action which we need to describe might be called "torus gyration".

Figure 4:
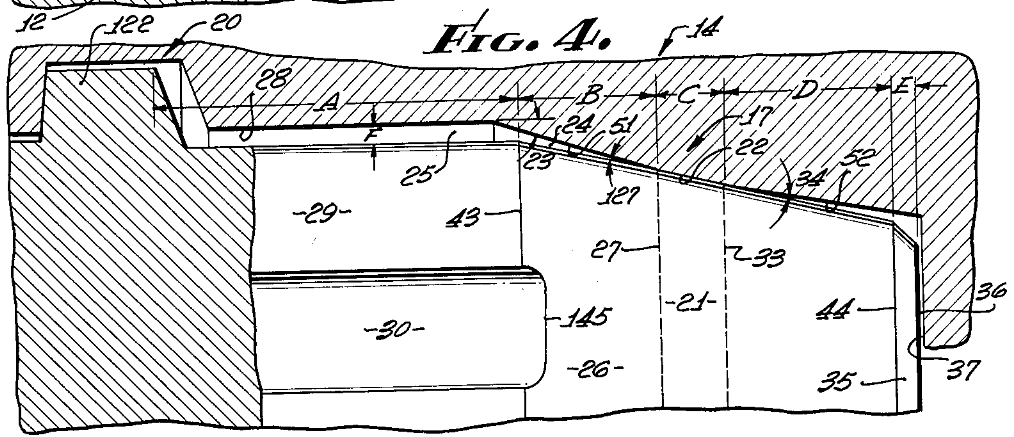
FIG. 4 is a view similar to FIG. 3 but showing a modified construction of the joint elements.

Referring now to FIG. 4, the principal difference as regards the joint construction from that shown in FIG. 3 has to do with formation of box interior forwardly tapered shoulders 51 and 52 as substitutes for the pin tapered surfaces 26 and 31 in FIG. 3. Thus, loci 27 and 33 as indicated by the broken lines are formed by the intersection of box surfaces 51 and 52 with the box tapered shoulder 22. Also, the pin shoulder 21 here extends from locus 43 to locus 44, and its taper is uniform throughout that forward extent. The angles 127 in 34 remain the same as discussed previously in FIG. 3. Also the relationships of dimensions A, B, C, D, E and F remain the same.

It should be observed that if the angle 127 is greater than about 4½ degrees in FIG. 4, the edge or locus 27 will tend to gouge into the pin shoulder 21, and particularly into the sealing area thereof, upon make-up of the joint. Also, if the angle 127 is smaller than about 3 degrees the edge or locus 27 will be insufficiently defined and the rearward limit of the pin interengagement with the box will tend to travel rearwardly toward the hob indentation, creating the risk of joint leakage at the indentation 30 under extreme well fluid pressure conditions.

In many instances, thread 122 will be formed on a pin member by means other than a hobbing operation, so that there will be no hob indentation 30 as such on the pin, a typical example of which is shown in FIGS. 8 and 9, to which the same numbers are applied as are used in FIGS. 3 and 5. However, nicking of the pin surface will frequently occur during lifting and loading of casing above ground as indicated by the indentations 115 and 116 at loci 43 and 44. Thus, the same problem of joint leakage is present where the joint thread is not hob formed, and the invention as discussed contemplates a solution to that problem created by nicking of the pin surface. Since nicks 115 are apt to extend well forwardly from locus 43, dimension "B" should be sufficiently great as to place the locus 27 at a safe distance forwardly from the locus 43. Also, dimension D should be sufficiently great as to place the locus 33 at a safe distance rearwardly from locus 44. As shown in FIGS. 8 and 9, the joint thread 122 has a rectangular section, and the dimension A extends rearwardly to the pin thread turn which is fully supported by the box upon pressure expansion of the pin.

It should also be noted that the teachings of the present invention apply whether the threads themselves are loose fitting or tight fitting, straight or tapered, single step or multiple step. And they apply for any thread form, and whether or not the joint utilizes any stop shoulders.

I claim:

1. An oil well casing joint, comprising tubular steel pin and box members the pin member being received axially forwardly into the box member, said members having interfitting threads and forwardly tapering shoulders having an annular frusto-conical interengagement locus spaced forwardly of said threads and through which sealing pressure is exerted, the width of said locus being substantially less than the pin radial thickness inwardly of said locus, said members having annular clearance therebetween flaring rearward from said interengaged shoulders and outwardly relative to the joint axis, the axial extent of said annular clearance being substantially greater than the axial dimension of the pin member axially forward of said clearance, the forward terminal end of the pin member being out of contact with the box member and free to deflect relatively inwardly toward the joint axis without restriction by the box member, at least one of said members having a forwardly tapering annular surface extending forwardly adjacent said clearance and intersecting said shoulder on said one member along a circular locus, whereby increased fluid pressure within the pin bore will expand the pin radially outwardly at said clearance thereby decreasing the width of the shoulder interengagement locus and increasing said sealing pressure keeping it greater than said increased fluid pressure, the clearance flare angularity in a radial axial plane being within the range 3 to 4½ degrees to prevent destructive shoulder indentation at said interengagement locus and to permit outward expansion of the pin at said clearance all in response to fluid pressure increase throughout a range up to approximately pipe bursting pressure, the other of said members also having a forwardly tapering annular surface extending forwardly adjacent said clearance to said shoulder on said other member, said members having opposed annular surfaces extending forwardly from said threads and intersecting respectively said forwardly tapering surfaces, said clearance being greater between said opposed annular surfaces than between said opposed tapering surfaces, said pin and box members having other opposed forwardly tapering annular surfaces and annular clearance therebetween extending forwardly from a location proximate the forwardmost extent of said interengagement locus.

2. The invention as defined in claim 1 in which the tapers of said box frustro-conical engagement shoulder and said box forwardly tapering annular surface are the same.

3. The invention as defined in claim 2 in which the taper of said pin frustro-conical engagement shoulder is greater than the taper of said pin forwardly tapering annular surface and the same as the taper of said box frustro-conical engagement shoulder.

4. The invention as defined in claim 1 in which the taper of said other forwardly tapering annular surface on the box is the same as the taper of said box frustro-conical engagement shoulder.

5. The invention as defined in claim 1 in which the difference between the tapers of said other opposed forwardly tapering annular surfaces on the pin and box members is within the range 1 to 2 degrees.

6. The invention as defined in claim 1 in which the tapers of said pin frustro-conical engagement shoulder and said pin forwardly tapering annular surface are the same.

7. The invention as defined in claim 6 in which the taper of said box frustro-conical engagement shoulder is less than the taper of said box forwardly tapering annular surface and the same as the taper of said pin frustro-conical engagement shoulder.

8. The invention as defined in claim 1 in which the taper of said other forwardly tapering annular surface on the pin is the same as the taper of said pin frustro-conical engagement shoulder.

9. The invention as defined in claim 1 in which the difference between the tapers of said other opposed forwardly tapering annular surfaces on the pin and box members is within the range 1 to 2 degrees.

10. The invention as defined in claim 1 in which the clearance between said opposed annular surfaces is such in relation to the rearward extent thereof between said interengaged shoulders and threads that the pin member will be pressurally expanded radially outwardly into engagement with the box at said annular surfaces before the clearance between said opposed tapering surfaces is eliminated.

11. An oil well pipe joint, comprising tubular steel pin and box members the pin member being received axially forwardly into the box member, said members having interfitting threads and shoulders having an annular frusto-conical interengagement locus spaced forwardly of said threads and through which sealing pressure is exerted between the pin and box members, the width of said locus being substantially less than the pin radial thickness inwardly of said locus, said members having annular clearance therebetween flaring rearwardly from said interengaged shoulders and outwardly relative to the joint axis, the axial extent of said annular clearance being substantially greater than the axial dimension of the pin member axially forward of said clearance, the forward terminal end of the pin member being out of contact with the box member and free to deflect relatively inwardly toward the joint axis, without restriction by the box member, whereby increased fluid pressure within the pin bore will expand the pin radially outwardly at said clearance thereby decreasing the width of the shoulder interengagement locus and increasing the sealing pressure keeping it greater than the increased fluid pressure, the clearance flare angularity in a radial axial plane being sufficiently small to prevent destructive shoulder indentation at said interengagement locus and sufficiently large to permit said outward expansion of the pin at said clearance all in response to fluid pressure increase throughout a range up to approximately pipe bursting pressure, said pin and box members having other opposed forwardly tapering annular surfaces and annular clearance therebetween extending forwardly from a location proximate the forwardmost extent of said interengagement locus.

12. An oil well casing joint, comprising tubular steel pin and box members the pin member being received axially forwardly into the box member, said members having interfitting threads and shoulders having an annular frusto-conical intergagement locus spaced forwardly of said threads and through which sealing pressure is exerted, the width of said locus being substantially less than the pin radial thickness inwardly of said locus, said members having annular clearance therebetween flaring rearward from said interengaged shoulders and outwardly relative to the joint axis, the axial extent of said annular clearance being substantially greater than the axial dimension of the pin member axially forward of said clearance, the forward terminal end of the pin member being out of contact with the box member and free to deflect relatively inwardly toward the joint axis without restriction by the box member, whereby increased fluid pressure within the pin bore will expand the pin radially outwardly at said clearance thereby decreasing the width of the shoulder interengagement locus and increasing said sealing pressure keeping it greater than said increased fluid pressure, the clearance flare angularity in a radial axial plane being within the range 3 to 4½ degrees to prevent destructive shoulder indentation at said interengagement locus and to permit outward expansion of the pin at said clearance all in response to fluid pressure increase throughout a range up to approximately pipe bursting pressure, said pin and box members having other opposed forwardly tapering annular surfaces and annular clearance therebetween extending forwardly from a location proximate the forwardmost extent of said interengagement locus.

13. An oil well casing joint, comprising tubular steel pin and box members the pin member being received axially forwardly into the box member, said members having interfitting threads and forwardly tapering shoulders having an annular frusto-conical interengagement locus spaced forwardly of said threads and through which sealing pressure is exerted, the width of said locus being substantially less than the pin radial thickness inwardly of said locus, said members having annular clearance therebetween flaring rearward from said interengaged shoulders and outwardly relative to the joint axis, the axial extent of said annular clearance being substantially greater than the axial dimension of the pin member axially forward of said clearance, the forward terminal end of the pin member being out of contact with the box member and free to deflect relatively inwardly toward the joint axis without restriction by the box member, at least one of said members having a forwardly tapering annular surface extending forwardly adjacent said clearance and intersecting said shoulder on said one member along a circular locus, whereby increased fluid pressure within the pin bore will expand the pin radially outwardly at said clearance thereby decreasing the width of the shoulder interengagement locus and increasing said sealing pressure keeping it greater than said increased fluid pressure, the clearance flare angularity in a radial axial plane being within the range 3 to 4½ degrees to prevent destructive shoulder indentation at said interengagement locus and to permit outward expansion of the pin at said clearance all in response to fluid pressure increase throughout a range up to approximately pipe bursting pressure, said pin and box members having other opposed forwardly tapering annular surfaces and annular clearance therebetween extending forwardly from a location proximate the forwardmost extent of said interengagement locus.

14. An oil well casing joint, comprising tubular steel pin and box members being received axially forwardly into the box member, said members having interfitting threads and forwardly tapering shoulders having an annular frusto-conical interengagement locus spaced forwardly of said threads and through which sealing pressure is exerted, the width of said locus being substantially less then the pin radial thickness inwardly of said locus, said members having annular clearance therebetween flaring rearward from said interengaged shoulders, and outwardly relative to the joint axis, the axial extent of said annular clearance being substantially greater than the axial dimension of the pin member axially forward of said clearance, the forward terminal end of the pin member being out of contact with the box member and free to deflect relatively inwardly toward the joint axis without restriction by the box member, at least one of said members having a forwardly tapering annular surface extending forwardly adjacent said clearance and intersecting said shoulder on said one member along a circular locus, whereby increased fluid pressure within the pin bore will expand the pin radially outwardly at said clearance thereby decreasing the width of the shoulder interengagement locus and increasing said sealing pressure keeping it greater than said increased fluid pressure, the clearance flare angularity in a radial axial plane being within the range 3 to 4½ degrees to prevent destructive shoulder indentation at said interengagement locus and to permit outward expansion of the pin at said clearance all in response to fluid pressure increase throughout a range up to approximately pipe bursting pressure, said pin and box members having other opposed forwardly tapering annular surfaces and annular clearance therebetween extending forwardly from a location proximate the forwardmost extent of said interengagement locus.

15. An oil well casing joint, comprising tubular steel pin and box members the pin member being received axially forwardly into the box member, said members having interfitting threads and forwardly tapering shoulders having an annular frusto-conical interengagement locus spaced forwardly of said threads and through which sealing pressure is exerted, the width of said locus being substantially less than the pin radial thickness inwardly of said locus, said members having annular clearance therebetween flaring rearward from said interengaged shoulders and outwardly relative to the joint axis, the axial extent of said annular clearance being substantially greater than the axial dimension of the pin member axially forward of said clearance, the forward terminal end of the pin member being out of contact with the box member and free to deflect relatively inwardly toward the joint axis without restriction by the box member, at least one of said members having a forwardly tapering annular surface extending forwardly adjacent said clearance and intersecting said shoulder on said one member along a circular locus, whereby increased fluid pressure within the pin bore will expand the pin radially outwardly at said clearance thereby decreasing the width of the shoulder interengagement locus and increasing said sealing pressure keeping it greater than said increased fluid pressure, the clearance flare angularity in a radial axial plane being within the range 3 to 4½ degrees to prevent destructive shoulder indentation at said interengagement locus and to permit outward expansion of the pin at said clearance all in response to fluid pressure increase throughout a range up to approximately pipe bursting pressure, the other of said members also having a forwardly tapering annular surface extending forwardly adjacent said clearance to said shoulder on said other member, said pin and box members having other opposed forwardly tapering annular surfaces and annular clearance therebetween extending forwardly from a location proximate the forwardmost extent of said interengagement locus.

References Cited in the file of this patent

UNITED STATES PATENTS

| | | |
|---|---|---|
| 951,704 | Schmidt | Mar. 8, 1910 |
| 2,006,520 | Stone | July 2, 1935 |
| 2,062,407 | Eaton | Dec. 1, 1936 |
| 2,111,196 | Texter | Mar. 15, 1938 |
| 2,239,942 | Stone | Apr. 29, 1941 |
| 2,746,486 | Gratzmuller | May 22, 1956 |
| 2,813,567 | Williams | Nov. 19, 1957 |
| 2,907,589 | Knox | Oct. 6, 1959 |

FOREIGN PATENTS

| | | |
|---|---|---|
| 544,656 | France | June 29, 1922 |